United States Patent

Carleton et al.

[11] 4,118,275
[45] Oct. 3, 1978

[54] VARIABLE FLOW CONTROL FOR A NUCLEAR REACTOR CONTROL ROD

[75] Inventors: Richard D. Carleton, Pittsburgh, Pa.; Ajay Bhattacharyya, Vasteras, Sweden

[73] Assignee: The United States of America as represented by the United States Department of Energy, Washington, D.C.

[21] Appl. No.: 532,285

[22] Filed: Dec. 12, 1974

Related U.S. Application Data

[63] Continuation of Ser. No. 283,260, Aug. 23, 1972.

[51] Int. Cl.² ............................................. G21C 7/08
[52] U.S. Cl. ............................................... 176/36 R
[58] Field of Search ................. 176/36 R, 61, 64, 86 R

[56] References Cited

U.S. PATENT DOCUMENTS

| 3,486,973 | 12/1969 | Georges et al. | 176/64 |
| 3,763,886 | 10/1973 | Lambert | 176/61 |

Primary Examiner—Samuel Feinberg
Attorney, Agent, or Firm—Dean E. Carlson; Randall G. Erdley; Z. L. Dermer

[57] ABSTRACT

A variable flow control for a control rod assembly of a nuclear reactor that depends on turbulent friction though an annulus. The annulus is formed by a piston attached to the control rod drive shaft and a housing or sleeve fitted to the enclosure housing the control rod. As the nuclear fuel is burned up and the need exists for increased reactivity, the control rods are withdrawn, which increases the length of the annulus and decreases the rate of coolant flow through the control rod assembly.

7 Claims, 5 Drawing Figures

VARIABLE FLOW CONTROL FOR A NUCLEAR REACTOR CONTROL ROD

This invention was made or conceived in the course of, or under a contract with the United States Department of Energy.

This is a continuation of application Ser. No. 283,260 filed Aug. 23, 1972.

BACKGROUND OF THE INVENTION

1. Field of the Invention

This invention relates generally to nuclear reactors, and more particularly, to a control rod assembly of a liquid metal-cooled fast breeder nuclear reactor.

2. Description of the Prior Art

A nuclear reactor is designed and operated for the purpose of initiating and maintaining a nuclear fission chain reaction in a fissile material for the generation of heat for power purposes.

In the type of nuclear reactor described herein, fissile materials, such as plutonium-239 and uranium-238, are contained within fuel assemblies. A plurality of fuel assemblies comprise a nuclear core which is structurally supported within a hermetically sealed pressure vessel. A reactor coolant, such as liquid sodium, is circulated into the reactor pressure vessel and through the nuclear core where the heat generated by nuclear fission is transferred from the fuel assemblies to the reactor coolant. This heat is eventually transformed into steam which is then converted into electrical energy by means of conventional steam generator, steam turbine and electrical generator apparatus.

Control of the nuclear fission chain reaction, or more simply, control of the reactor is usually accomplished by control rod assemblies made up of neutron absorbing materials, such as boron carbide or tantalum. The control rod assemblies may be in the form of annular rings, clusters of rods or singular rods interdispersed throughout the nuclear core. The effectiveness of the control rod assemblies is determined by the amount of neutron absorbing or poison material introduced into the nuclear core. Withdrawing a control rod increases the nuclear reaction, while inserting a control rod decreases the nuclear reaction. At the beginning of a fuel cycle, the control rods are fully inserted. As the nuclear fuel burns up, the control rods are withdrawn to compensate for the decrease in nuclear activity.

The cooling requirements of the control rods depend upon their position with reference to the nuclear core. The heat generation rate within the control rods is highest when the rods are fully inserted. In the past, this position has been used as a reference to size orifices in order to assure adequate coolant flow through the control rod assemblies. However, at less than maximum heat generation, corresponding to less than full insertion, fixed area orificing causes over-cooling of the control rods, giving rise to uneven temperature distributions and unfavorable thermal stresses. The cooler exit temperature of the control rod coolant also lowers the overall temperature rise of the nuclear core reactor coolant which lowers the power plant efficiency. Thus, fixed area orificing of the control rod coolant flow of the prior art results in severe reactor penalties.

SUMMARY OF THE INVENTION

This invention provides control rods for a nuclear reactor with variable flow control for varying coolant flow through the control rod assembly in accordance with the position of the control rod relative to a nuclear core.

In one embodiment of this invention, flow restricting annular gaps are provided above and below the control rod portion of the control rod assembly. The flow gaps are formed by clearance between pistons located on the control rod drive shaft and hollow sleeves or housings fitted to the inside of an opening in the nuclear core. These sleeves or housings have separate sleeves installed therein or necked down portions to provide restrictions to fluid flow through the sleeves or housings. As the control rods are withdrawn from the nuclear core, which corresponds to a decrease in heat generated within the control rod, the pistons further engage the hollow sleeves or housings, thereby increasing the length of the flow restricting gaps between the pistons and the necked down portion or the separately installed sleeves. This decreases the coolant flow through the control rod assemblies. As the control rods are inserted, the length of flow restriction is decreased, which correspondingly increases the coolant flow. In this manner, the coolant flow through the control rod assembly is optimized, regardless of the position of the control rod relative to the nuclear core. Thus, the thermal stress problem and the reduction of overall power plant efficiency of the prior art are eliminated.

DESCRIPTION OF THE DRAWINGS

Other advantages of the invention will be apparent from the following detailed description, taken in consideration with the accompanying drawings in which.

DESCRIPTION OF THE PREFERRED EMBODIMENTS

Figure 1:
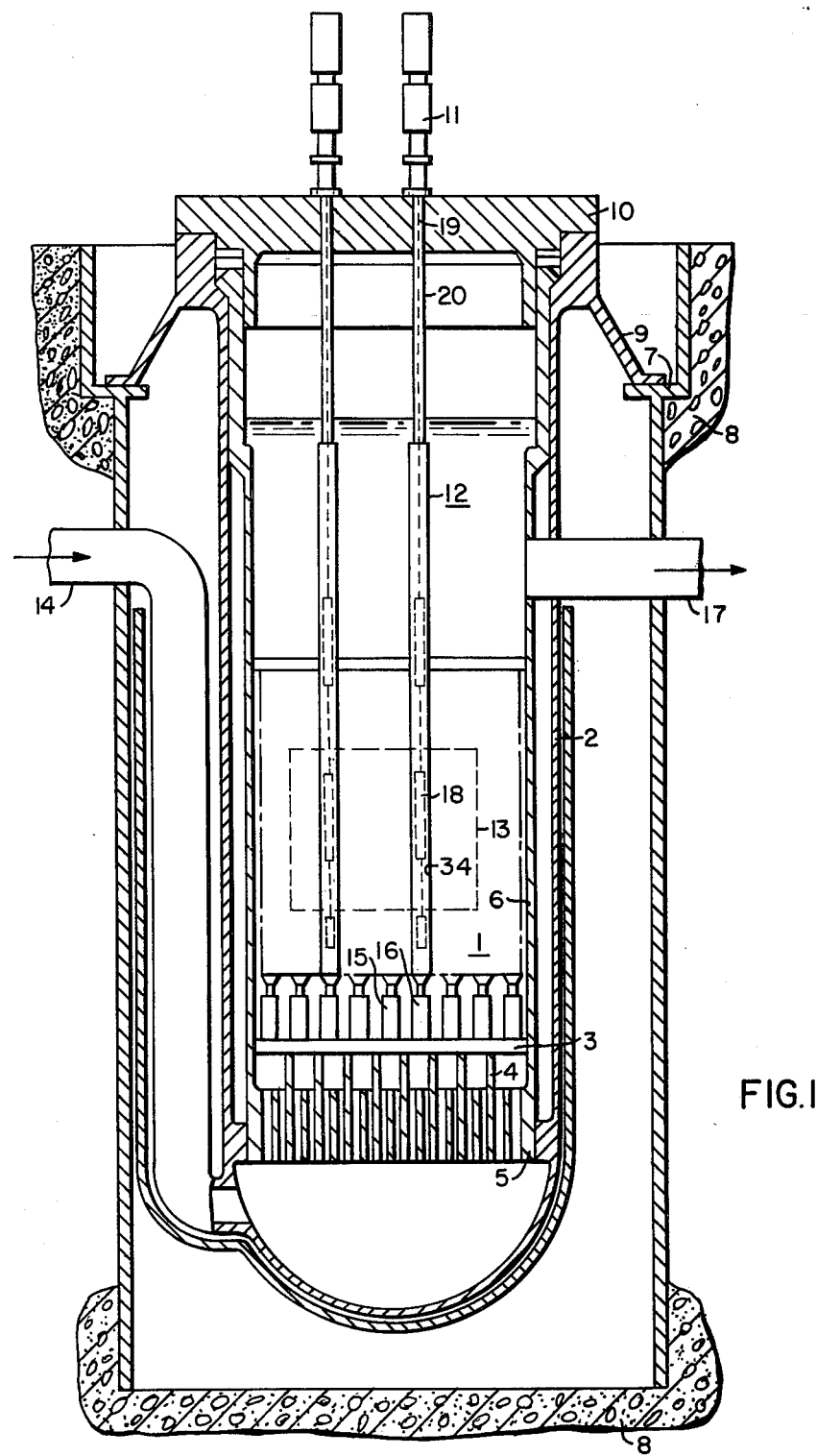
FIG. 1 is a vertical sectional view of one form of a nuclear reactor to which this invention may be applied.

Throughout the description which follows, like reference characters indicate like elements in the various figures of the drawings.

Referring now more particularly to FIG. 1 of the drawings, the nuclear reactor illustrated therein is a liquid metal-cooled fast breeder reactor. The invention, however, is not restricted to this type of nuclear reactor. It may be applied to any type of reactor system provided the control rods are cooled separate from other apparatus, such as fuel assemblies. A nuclear core 1 contained within a pressure vessel 2 is axially supported by a lower core plate 3, which in turn is supported by columns 4 attached to a lower support structure 5. The core load from the lower support structure 5 is transferred to a core barrel 6 and ultimately to a support ledge 7 in a reactor vessel vault 8 by a pressure vessel flange 9.

The upper end of the reactor pressure vessel 2 is hermetically sealed by a removable closure head 10, upon which is mounted a plurality of control rod drive mechanisms 11. FIG. 1 only shows two such rod drive mechanisms for purposes of simplicity. Each rod drive mechanism 11 is connected to a control rod assembly 12, which penetrates the reactor pressure vessel 2 and extends into an opening 34 in the nuclear core 1.

The nuclear core 1 is comprised of a plurality of fuel assemblies (not shown) containing nuclear fuel. In a fast breeder nuclear reactor, the nuclear fuel primarily consists of fissile plutonium-239 and uranium-238, the latter of which is both fissile and fertile. During reactor operation, the fissile fuels undergo nuclear fission producing heat, which is eventually converted into electrical energy. On capture of an excess neutron, which is produced during reactor operation, the fertile uranium-238 is converted into plutonium-239, which may later be used as fuel in another nuclear core. In general, the fissile fuels are located within an active core region 13 of the nuclear core 1, while the fertile fuel is located throughout the nuclear core 1.

The heat produced by fission of the nuclear fuel is removed by flowing a reactor coolant, such as liquid sodium, through the nuclear core 1. The reactor coolant enters the reactor pressure vessel 2 by way of an inlet pipe 14 attached to the bottom of the reactor pressure vessel 2. Within the pressure vessel 2, the reactor coolant flows up through the lower support structure 5 and into the fuel assembly inlet nozzles and the control rod inlet nozzles, 15 and 16, respectively. The heat produced by fission is transferred from the fuel assemblies to the coolant flowing therein. The heat generated within the control rod assemblies 12 by absorption of gamma radiation produced during the fission process is also removed by the reactor coolant. The hot reactor coolant exits the nuclear core 1 and then flows out of the pressure vessel 2 through an outlet pipe 17 located at the upper end of the pressure vessel 2. The reactor coolant then flows to a heat exchanger (not shown) where it retransfers its previously acquired heat and is pumped back into the pressure vessel 2, repeating the described flow cycle.

The control rods function to increase or decrease the output power of the nuclear reactor and to shut down the nuclear reactor. These functions are accomplished by inserting or withdrawing a control rod 18 containing neutron absorbing material, such as boron carbide, into or from the openings 34 in the active core region 13. As shown in FIG. 1, the control rod 18 is attached to a drive shaft 19, which is coupled to the rod drive mechanism 11. A housing or sleeve 20 is located in each of the openings 34 in the nuclear core and fully encloses the control rod 18 and the drive shaft 19. The housing or sleeve 20 serves to guide the axial motion of the control rods and provides a separate flow channel for the control rod coolant flow. The coolant flow through the control rod coolant housing or sleeve 20 is very small compared to the coolant flow through the fuel assemblies. The reduced control rod coolant flow rate is obtained by appropriately sized orifices which are placed in the inlet nozzle 16 of the control rod assembly 12.

Figure 2A:
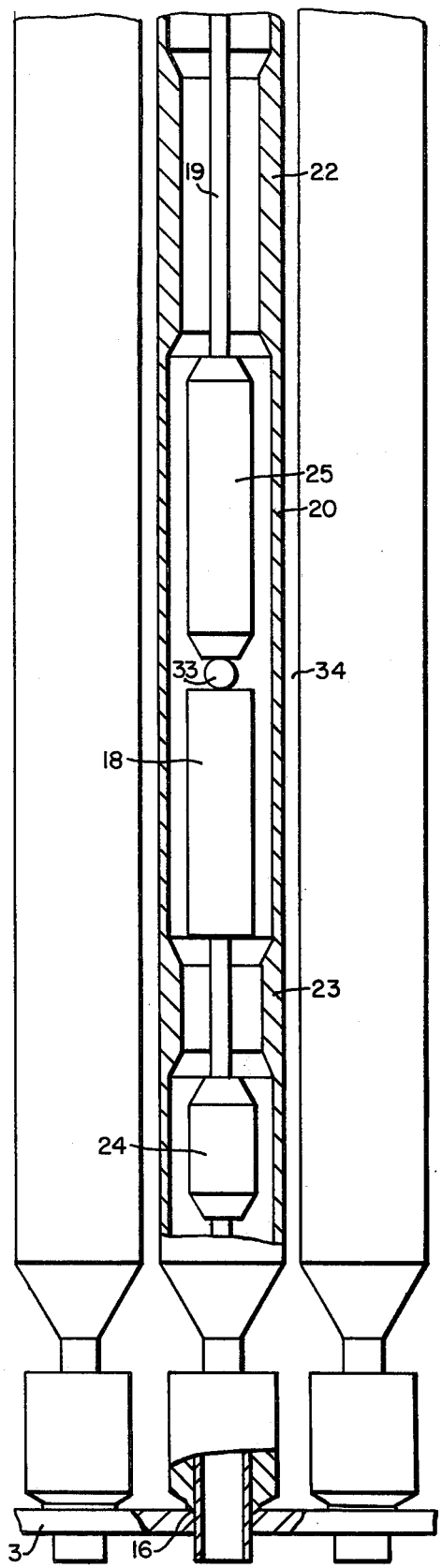
FIG. 2a is an enlarged fore-shortened view of a fully inserted control rod with one form of variable flow control.
Figure 2B:
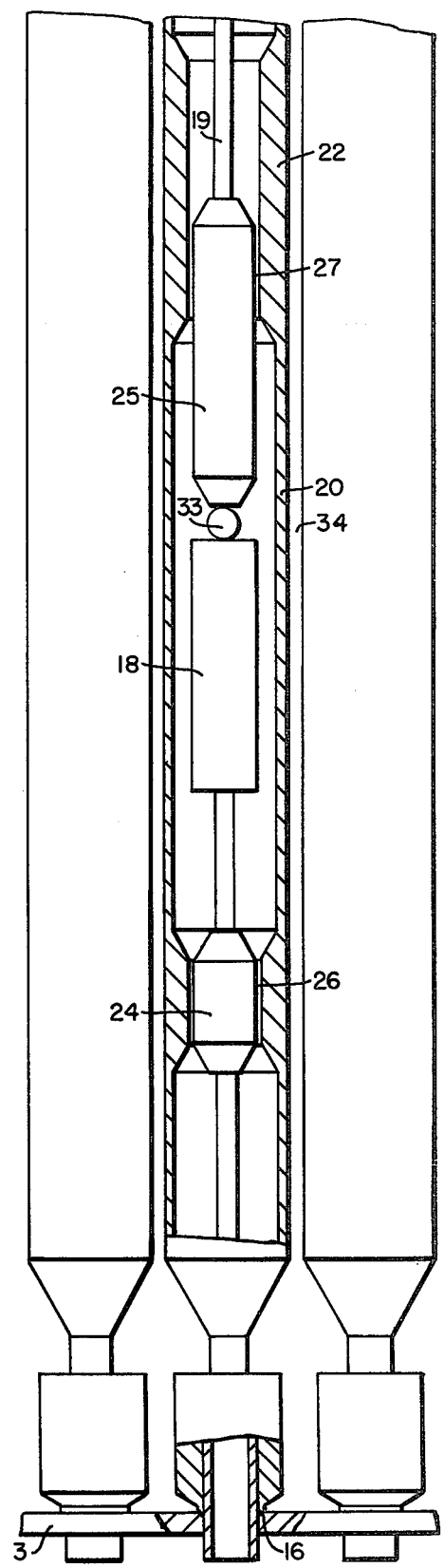
FIG. 2b is a view of the control rod of FIG. 2a but in a partially withdrawn position.

The control rod 18 shown in FIG. 2a is in the fully inserted position with respect to the nuclear core 1. This position corresponds to the beginning of the nuclear fuel cycle. As the nuclear fuel burns up, less poison or neutron absorbing material is needed to maintain a sustained nuclear fission chain reaction, consequently the control rod 18 is withdrawn. FIG. 2b shows the control rod 18 in a withdrawn position. The cooling requirements of a withdrawn control rod are less than that of a fully inserted control rod because of a lower heat generation rate in the former. Should the coolant flow through the control rod remain the same, then the withdrawn control rod will be overcooled and inefficient use of reactor coolant will result.

The variable flow control provided by this invention automatically reduces the control rod coolant flow rate as the control rod is withdrawn. The housing or sleeve 20, is provided with necked down portions, such as at 22 and 23. Although the parts 22 and 23 have been shown as necked down portions of the housing or sleeve 20, the smaller inside configurations may be provided by installing separate sleeves inside the housing or sleeve 20 by welding them to the inside of the housing or sleeve 20, or by attaching them to the sleeve or housing 20 in any other suitable manner. Pistons 24 and 25, having a diameter slightly less than the housings or sleeves 22 and 23, are attached to the control rod drive shaft 19 above and below the control rod 18. The pistons 24 and 25 may be made hollow so as to minimize the heat generated within pistons 24 and 25 and prevent bowing of the drive shaft 19. In the fully inserted position shown in FIG. 2a, pistons 24 and 25 do not engage the necked down portion of the housing or sleeve 20, such as housings or sleeves at 22 and 23. While in this position, flow control is achieved only by orifices within the inlet nozzle 16. As the control rod 18 is withdrawn to compensate for burn up of the nuclear fuel, piston 24 and 25 increasingly engage within the housings or sleeves at 22 and 23 as shown in FIG. 2b. The annular flow gaps 26 and 27 thus formed cause resistance to the control rod coolant flow. This flow resistance, caused by turbulent friction through an annulus, increases as the control rods are further withdrawn, thereby decreasing the control rod coolant flow. In this manner, the reduced coolant flow requirements of the control rod are automatically obtained as the control rod is withdrawn.

The shape of pistons 24 and 25 and housings or sleeves at 22 and 23 may be streamlined by appropriate tapering or some other like technique so as to eliminate all risks of seizure and to reduce flow cavitation associated with annular flow restrictions. In the latter regard, flow annulus 26 may be made to become operative prior to flow annulus 27 by proper axial positioning of either piston 24 or sleeve 23 with respect to piston 25 and sleeve 22. Also, the size of flow annulus 26 may be adjusted to reduce further any possibility of flow cavitation in flow annulus 27 which provides the main flow resistance. It is also possible to alter the flow resistance provided by annuli 26 and 27 by, for example, roughening the surfaces of pistons 24 and 25 or by tapering pistons 24 and 25. These latter adjustments may be used either singly or in combination. A flexible mechanical connection 33 such as a ball joint connection may be incorporated between the upper piston 25 and control rod 18 to lessen sensitivity of the control rod assembly 12 to bowing caused by temperature non-uniformity or irradiation induced swelling.

Figure 3A:
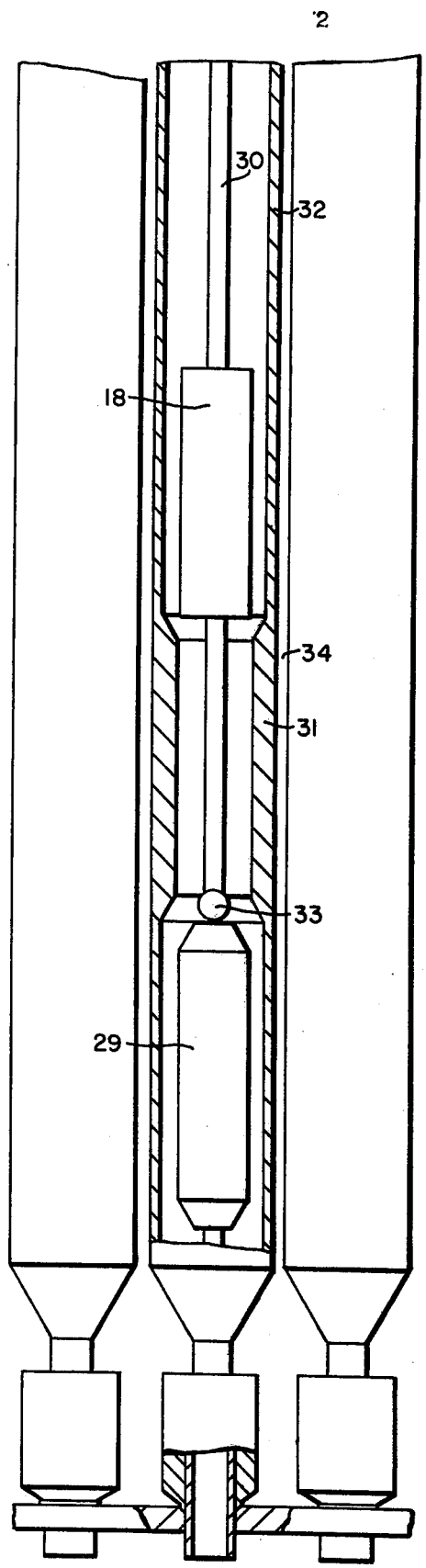
FIG. 3a is an enlarged fore-shortened view of a fully inserted control rod with another form of variable flow control.
Figure 3B:
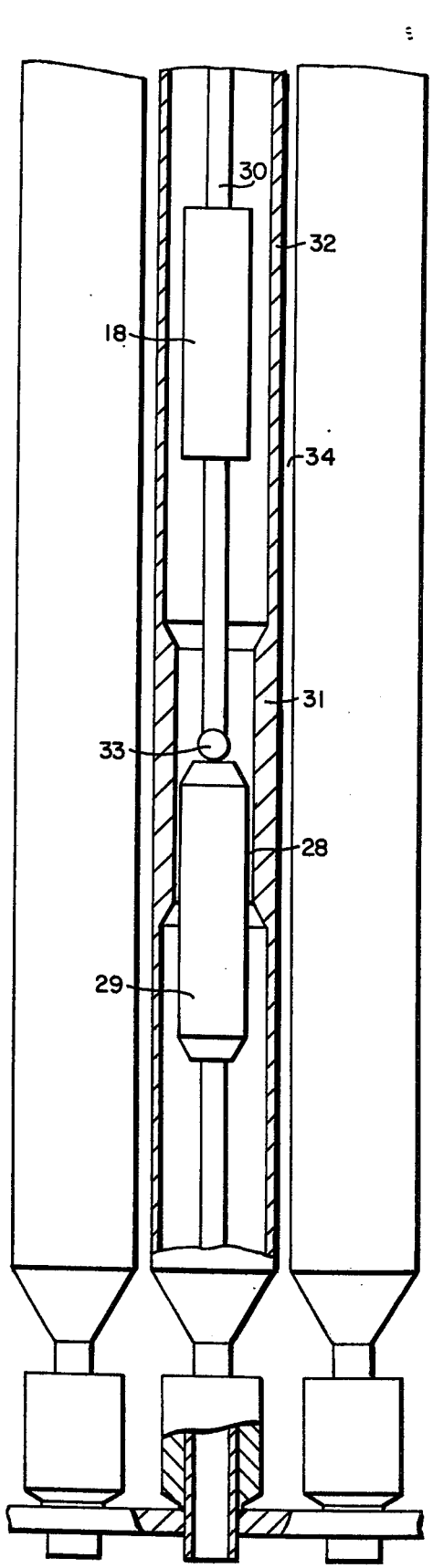
FIG. 3b is a view of the control rod of FIG. 3a but in a partially withdrawn position.

FIGS. 3a and 3b show another variation of the variable flow control as applied to the control rod 18. In this embodiment, a single flow restricting annular gap 28 is provided below the neutron poison section 18 of the control rod assembly. Annulus 28 is formed by a piston 29 attached to a control rod drive shaft 30 engaging with a necked down portion of the housing or sleeve 20, such as a housing or sleeve 31 fitted to the inside of the control rod housing or sleeve 32. A single annulus 28 is possible at the location shown because the coolant temperature below the control rod 18 is lower, which allows higher coolant flow velocities without the threat of coolant flow cavitation. One potential disadvantage of this embodiment is that an adequate length of flow gap 28 may not be obtained to reduce sufficiently the control rod coolant flow when the control rod is withdrawn as shown in FIG. 3b. That is, that the location of the control rod 18 relative to the active core region 13 (FIG. 1) may not leave sufficient room below the control rod 18 to incorporate an annulus 28. However, this consideration depends upon actual core geometry for a particular nuclear reactor. All other considerations, such as the flexible mechanical joint 32, piston 29 and sleeve 31, shape, size and roughness of the prior embodiment apply equally to this embodiment.

From the foregoing description, taken in connection with the drawings, it is seen that this invention provides a simple means to effectively vary the control rod coolant flow during operation of the nuclear reactor. As the control rods are withdrawn from a fully inserted position, the flow resistance internal to the control rod assembly automatically increases, thereby decreasing the coolant flow through the control rod assemblies.

Since numerous changes may be made in the above-described apparatus, different embodiments of the invention may be made without departing from the spirit and scope thereof, it is intended that all the matter contained in the foregoing description or shown in the accompanying drawings shall be interpreted as illustrative and not in a limiting sense.

What we claim is:

1. In a nuclear reactor, said reactor comprising a nuclear core having openings therein, a plurality of control rod assemblies, each control rod assembly being positioned and movable into and out a respective opening in said nuclear core, said control rod assembly comprising a control rod containing neutron absorbing material, a drive shaft attached thereto for driving said control rod into and out of said opening in said nuclear core, said reactor further comprising a plurality of housings, each being respectively positioned in said opening and enclosing said control rod assembly therein, means for circulating a reactor coolant through said housings to remove heat generated within said control rods, and means for varying said reactor coolant flow rate through said housings in accordance with the position of said control rods relative to said nuclear core comprising means forming at least one flow restriction located within each of said housings, said flow restrictions having a resistance which varies in relation to said control rod motion.

2. The apparatus of claim 1, wherein said means for varying said coolant flow rate comprises means attached to each of said drive shafts and to each of said housings forming at least one flow restricting gap, wherein the length of said gap varies in relation to said control rod motion.

3. The apparatus of claim 1, wherein said means for varying said coolant flow rate comprises at least one piston connected to and movable with each of said drive shafts, and at least one sleeve connected to the interior surface of each of said housings, whereby said piston coacts with said sleeve forming at least one variable flow restriction for each combination of said housings and said control rod assemblies.

4. The apparatus of claim 3, wherein at least one of said variable flow restrictions is located below said control rod.

5. The apparatus of claim 3, wherein at least one of said variable flow restrictions is located above said control rod, and at least one of said variable flow restrictions is located below said control rod forming a linear series of variable flow restriction.

6. The apparatus of claim 1, including flexible mechanical means incorporated in said drive shaft for transmitting motion from said drive shaft to said control rod, and for adjusting for angular misalignment of said drive shaft and attached control rod.

7. The apparatus of claim 6, wherein said flexible mechanical means is a ball and socket connection.

* * * * *